Oct. 17, 1933.  E. R. EVANS  1,930,675
BRAKE CONSTRUCTION
Filed Oct. 7, 1929   3 Sheets-Sheet 1
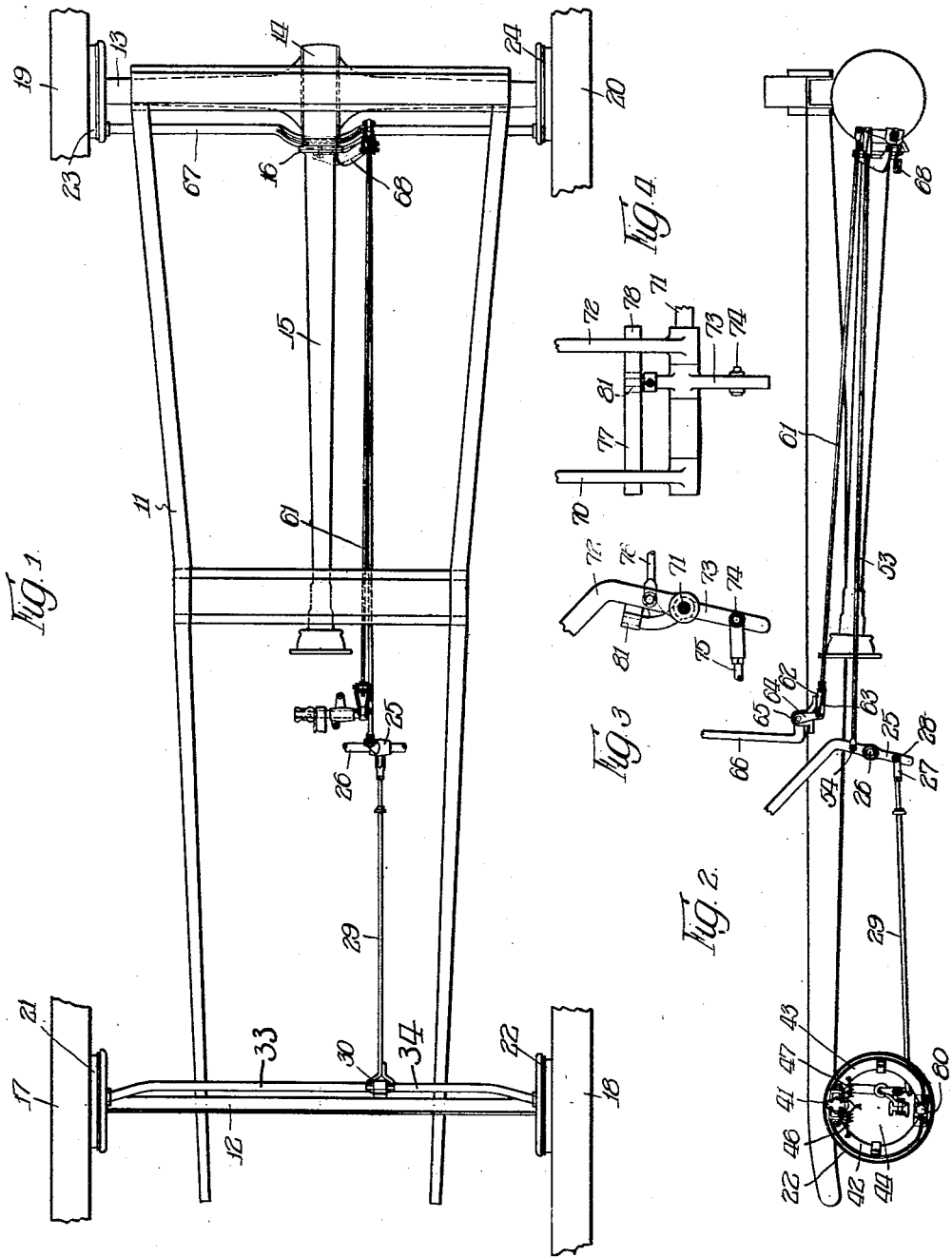
Inventor
Edwin R. Evans,
By Wilkinson Huxley Byron + Knight
Attys.

Oct. 17, 1933.     E. R. EVANS     1,930,675
BRAKE CONSTRUCTION
Filed Oct. 7, 1929     3 Sheets-Sheet 2
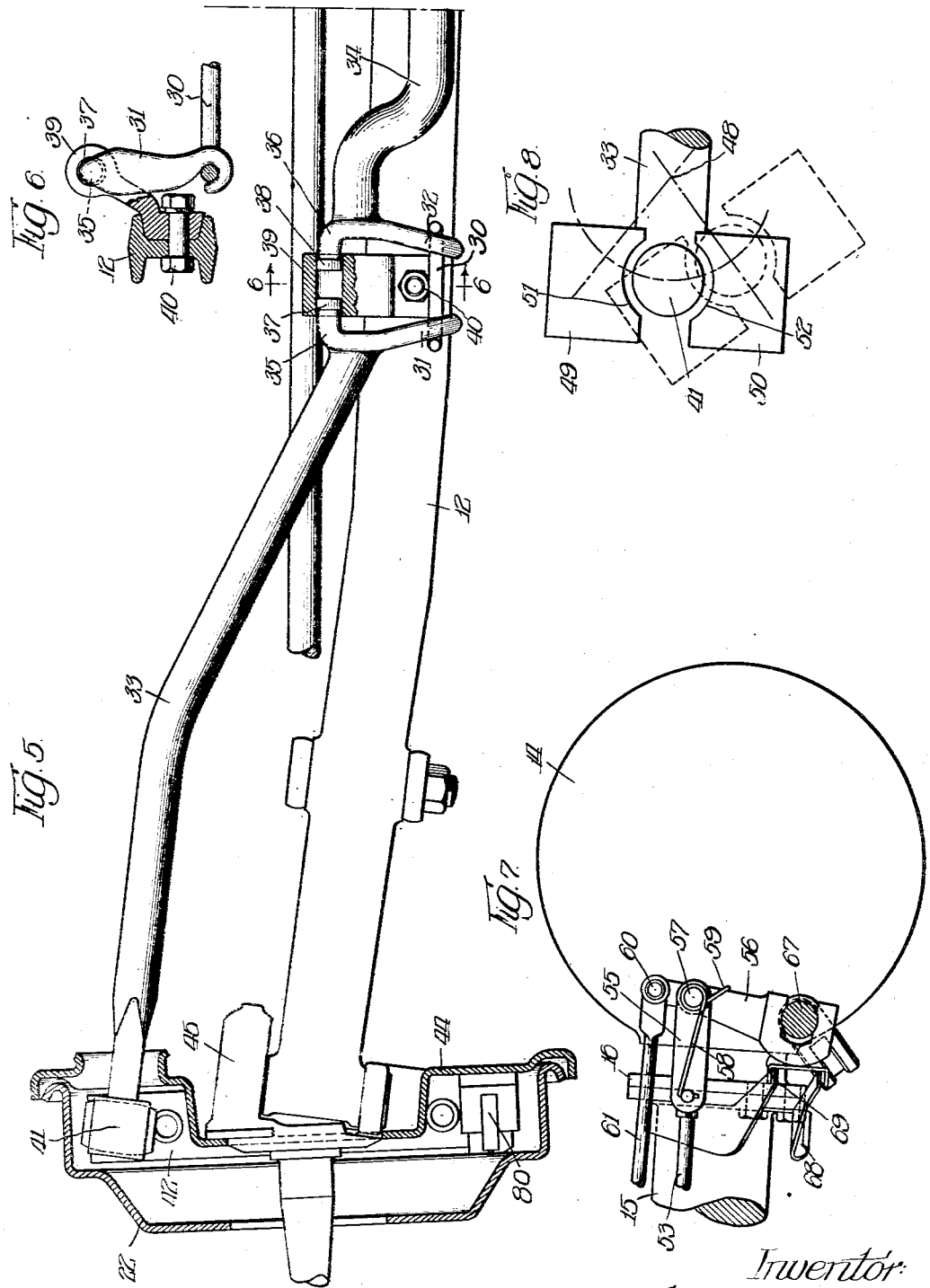
Inventor
Edwin R. Evans,
By Wilkinson Huxley Byron & Knight
Attys

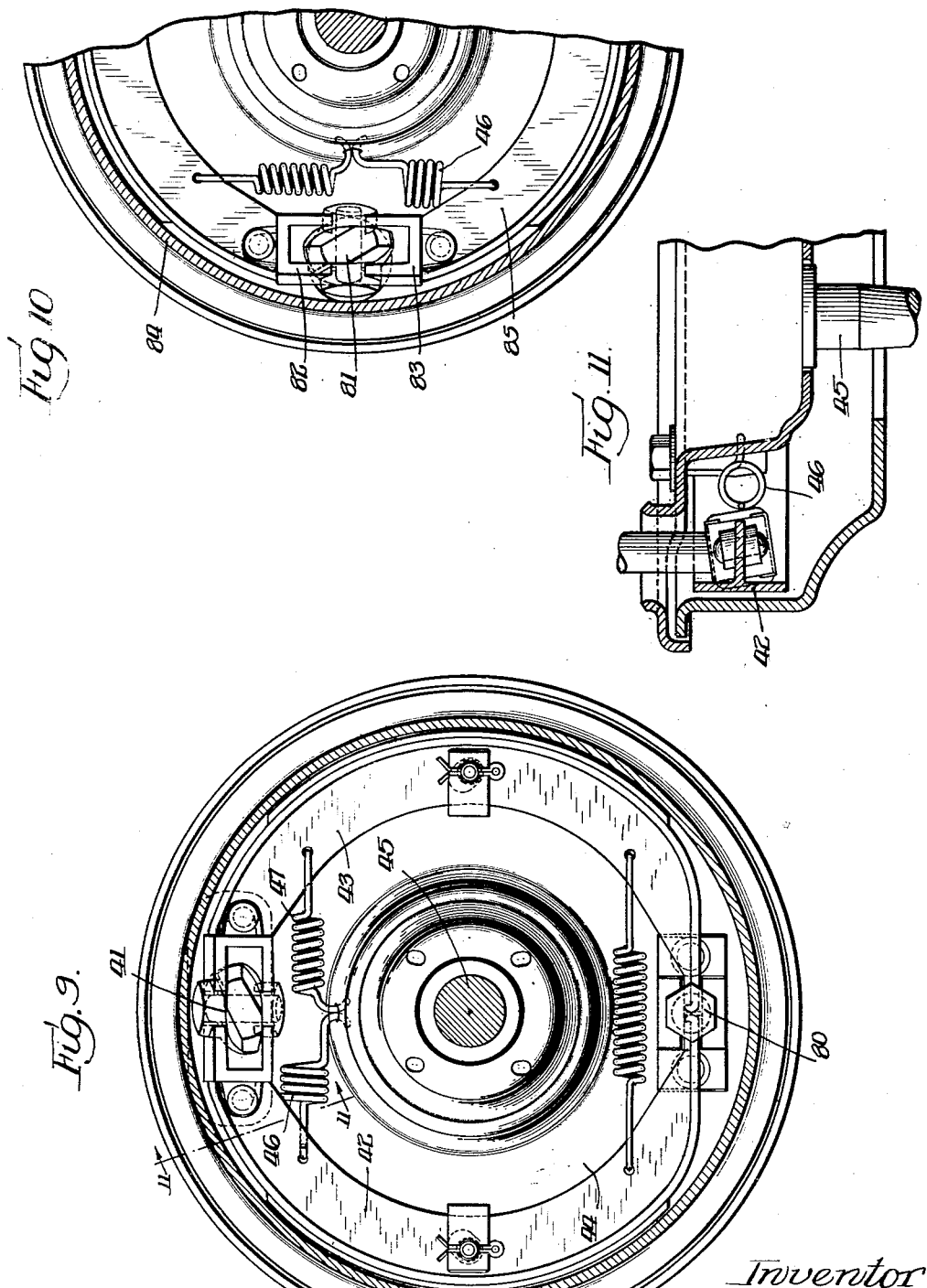

Patented Oct. 17, 1933

1,930,675

UNITED STATES PATENT OFFICE 1,930,675

BRAKE CONSTRUCTION

Edwin R. Evans, Chicago, Ill.

Application October 7, 1929. Serial No. 397,997

10 Claims. (Cl. 188—10)

This invention relates to a new and improved brake construction, and more particularly to a construction of a vehicle brake linkage and associated parts.

It is an object of the present invention to provide a new and improved linkage which is simple in design and construction.

It is a further object to provide a construction of this character in which the operating parts are largely supported from the vehicle axles.

It is an additional object to provide a construction in which the rear brakes are operated by a transverse brake rod carried by the rear brakes.

It is also an object to provide such a construction in which means are provided for taking up the braking pull transmitted to the transverse brake rod.

It is a further object to provide front brake rods and connections adapted to permit movement of the rods transversely of the vehicle during steering movements.

It is an additional object to provide a construction adapted for commercial production and installation.

It is also an object to provide a construction in which means are provided whereby the clutch pedal may serve to take up or account for slack in the brake linkage.

Other and further objects will appear as the description proceeds.

I have shown certain preferred embodiments of my invention in the accompanying drawings, in which—

Figure 1 is a somewhat diagrammatic view of a vehicle chassis with my invention applied thereto;

Figure 2 is a side elevation, partly broken away, of the construction shown in Figure 1;

Figure 3 is a fragmentary side elevation showing a modified form of brake lever construction;

Figure 4 is a view of the construction of Figure 3 as seen from the right;

Figure 5 is a fragmentary transverse view on an enlarged scale and partly in section showing the application of the brake to the front axle;

Figure 6 is a fragmentary section taken on line 6—6 of Figure 5;

Figure 7 is a fragmentary elevation showing the brake construction at the rear axle;

Figure 8 is a diagrammatic view showing the endwise movement of the front brake shafts;

Figure 9 is a view on an enlarged scale showing the front brake assembly of Figure 2;

Figure 10 is a fragmentary view similar to Figure 9 but showing the cam portion of the rear wheel brakes; and Figure 11 is a section taken on line 11—11 of Figure 9.

Referring first to Figures 1 and 2, the vehicle chassis includes the frame 11, the front axle 12 and rear axle 13, the latter having the differential housing 14 located at its middle point. The drive shaft housing 15 is connected by flange 16 to the differential housing 14. The engine and other portions of the vehicle supported on the chassis have been omitted as they form no part of the present invention. The front wheels 17 and 18 are carried by the front axle and the rear wheels 19 and 20 by the rear axle. The front wheels 17 and 18 are provided with the brake drums 21 and 22 and the rear wheels 19 and 20 are provided with the brake drums 23 and 24.

The brake applying lever 25 is pivoted at a median portion of the chassis on the cross shaft 26. It will be understood that this cross shaft 26 may be supported on any part of the vehicle structure carried by the chassis, and in the usual form of construction may be the shaft carrying the clutch pedal. It will be understood, however, that the brake lever 25 is freely rotatable on the shaft 26 which merely serves as a pivot for the lever. The lower end of the lever 25 has a yoke 27 pivoted thereto at 28, this yoke being connected to the front pull rod 29 which is provided at its forward end with the yoke 30.

The front brake construction is best shown in Figures 5 and 6 and as shown in Figure 6 the yoke 30 is hung upon the lever arms 31 and 32 which are rigidly connected to the front brake cross shafts 33 and 34. These shafts 33 and 34 are further provided with the pivot extensions 35 and 36 which are in turn provided with the rounded or barrel-shaped bearings 37 and 38. The bearings 37 and 38 are supported within a cylindrical opening in the bracket 39 which is secured to the front axle 12 by means of the bolt 40.

The front axle cross shaft 33 is provided with the brake operating cam 41 which fits between the upper ends of the brake shoes 42 and 43. These brake shoes 42 and 43 are housed in the brake drum 22, as best shown in Figure 9, and are supported from the adjustable pivot 80 which is carried by the backing plate 44. This plate 44 is secured to the steering knuckle 45 which is pivotally mounted on the end of the front axle 12.

As shown in Figure 2, the brake shoes 42 and 43 are provided with the return springs 46 and 47 which are hooked into the backing plate 44.

The spring 46 on the shoe 42 is shown as heavier than the spring 47 connected to the shoe 43. This construction causes a greater return pull on the front shoe 43 which, in the construction shown, is the wrapping shoe when the vehicle is moving forward. This variation in spring return may be so proportioned as to equalize the application of the two shoes in normal brake use and to cause the unwrapping shoe to be first applied in such use.

The front transverse brake shaft 34 will be inclined upwardly at its end above the front axle 12 in a manner similar to the transverse shaft 33, and will similarly operate the brakes upon the other wheel.

As shown in Figure 5, the cam 41 is located outwardly of the axis of the steering knuckle 45 and consequently there will be a longitudinal thrust upon the brake shaft 33 when the wheel is moved in steering the vehicle. This is shown diagrammatically in Figure 8, where the point 48 designates the axis of the steering knuckle 45. The shaft 34 will similarly move as the wheel with which it is associated is turned in steering. This longitudinal movement of the transverse shafts 33 and 34 is permitted by nature of their support in the bracket 39. The bearing extensions 35 and 36 on the shafts are of such length and so proportioned as to permit a longitudinal movement of the shafts amply sufficient to take care of any which may be caused by a complete steering movement.

As clearly shown in Figure 8, the bearing members 49 and 50 on the ends of the brake shoes are formed with arcuate surfaces 51 and 52 which engage the cam 41 and maintain it in proper location relative to the brake shoes and wear plates. These arcuate surfaces will cause the longitudinal movement of the brake shafts under steering movement of the wheels. The yoke 30 which engages the hooks on the lower ends of the operating arms 31 and 32 permits relative movement between the two arms without disengagement of the yoke from the arms or without affecting the brake operating movement.

The rear brake construction includes the rear pull rod 53 which is pivotally secured at 54 to the brake lever 25 at a point above the pivot of that lever. The rear end of the pull rod 53 is best shown in Figure 7 and is connected by the links 55 to the rear brake shaft operating arm 56 at the point 57. A spring 58 is provided which extends alongside the links and is hooked around the pivot pin 57. This spring 58 has a median portion 59 which extends around the rear of the lever arm 56. The spring tends to depress the forward or left end of the links 55, as seen in Figure 7. The upper end of the lever 56 is connected by a pivot pin 60 with the hand brake pull rod 61. This pull rod 61, as shown in Figure 2, is connected by the links 62, provided with spring 63, to the lever arm 64 which is shown as pivoted at 65, and adapted to be operated by hand lever 66.

The rear transverse brake shaft 67 is a unitary structure carrying brake shoe operating cams on its ends located within the brake drums 23 and 24, shown in Figure 1. These cams and the brake shoes and associated structures, shown in Figure 10, may be similar to those described in connection with the front wheel brakes. The transverse brake shaft 67 is supported solely by the bearing of the operating cams 81 on the wear plates 82 and 83 on the ends of the brake shoes 84 and 85. The bracket 68 is provided to take up the strain of the braking pull upon the shaft 67. This bracket 68 is shown as secured by the bolts which connect the drive shaft housing 15 to the flange 16 on the differential housing 14. The transverse shaft 67 adjacent the point of connection thereto of the operating arm 56, is provided with the rounded surface 69 which bears against the flat face of the bracket 68.

A modified form of construction has been shown in Figures 3 and 4. Here the clutch pedal arm 70 is secured to the clutch pedal shaft 71, and the brake pedal arm 72 is freely rotatable on the shaft 71. The brake lever 73 is also pivotally supported on the shaft 71 at a point intermediate the clutch arm 70 and brake arm 72. This lever 73 is connected at its lower portion by pivot 74 to the front pull rod 75. It is connected at an upper portion to the rear pull rod 76. Above the connection of the pull rod 76 the brake lever 73 has the cross lever 77 pivoted thereto at 81. The lever 77 passes over in front of the clutch lever arm 70 and the shorter end 78 of the lever passes in front of the brake lever arm 72.

In the operation of the brakes as shown in the present application, the brake lever 25 will normally be operated by foot pressure upon a pedal attached to its upper end, which operation will rotate the lever in the counterclockwise direction about the pivot shaft 26. This movement of the lever 25 will draw the front pull rod 29 rearwardly. This movement of the pull rod will be communicated to the yoke 30 which will pull rearwardly on the operating arms 31 and 32. This will cause the transverse brake shafts 33 and 34 to rotate in the counterclockwise direction about the pivot portions 37 and 38. The brake operating cam 41 and the similar cam connected to the brake shaft 34 will thus be operated in the counterclockwise direction and will thrust against the wear plates on the end of the brake shoes, separating the adjacent ends of the shoes and forcing them into engagement with the brake drums. This movement will be resisted by the pull-back springs 46 and 47. The transverse shafts 33 and 34 float upon their inner pivots 37 and the outer pivots between the operating cams and the wear plates on the brake shoes which support the cams and restrain them against longitudinal displacement as shown in Figure 8. The braking operation may take place with the wheels in any steering position.

This counterclockwise rotation of the lever 25 will cause a forward pull upon the rear pull rod 53. This will be transmitted through links 55 to the operating arm 56, which is formed as a part of the transverse brake shaft 67. This will cause a counterclockwise rotation of the shaft 67 and the consequent application of the rear brakes due to the separation of the brake shoes by the cams carried by the ends of the shaft 67. The shaft 67 floats between the opposite sets of brake shoes and has no connection to the axle. It is formed with a yoked portion extending around the crank case 14, so that it may be rotated freely without contact with the axle.

In order that the pull through the pull rod 53 may cause merely a rotary movement of the shaft 67 and not cause a forward pull upon the ends of the shaft, the bearing bracket 68 is provided. This takes up the longitudinal pull from the rear brake pull rod by means of the contact with the rounded surface 69. During the operating movement of the arm 56, the hand brake pull rod 61 will be moved forwardly. This will not, however, cause a movement of the hand lever 66 as the forward movement will merely cause the point of connection between the links 62 and the pull rod 61 to move downwardly to take up the movement of the pull rod. This downward movement is aided by the spring 63 which also takes up any slack and prevents rattle of the parts.

The rear brakes may be applied by a clockwise movement of the hand lever 66 which causes a forward pull through the arm 64, links 62 and pull rod 61. This movement will not cause a forward thrust upon the main brake lever 25 as the spring 58 will swing the links 55 downwardly to take up the slack afforded by the forward movement of the pivot point 57.

The form of construction shown in Figures 3 and 4 may be applied to the constructions shown, in substitution for the lever 25 of the remaining figures. The parts may be so proportioned that a pressure on the clutch pedal will move the arm 70 sufficiently to carry the cross lever 77 downwardly enough to take up all slack in the brake linkage and connections. This will render the brake linkage immediately responsive to the brake arm 72 which will engage the short end 78 of lever 77 as the brake pedal is depressed, to actually apply the brakes for retarding the movement of the car. The lengths of the portions of lever 77 on opposite sides of the pivot 81 may be varied to give any desired distribution of power application between the arms 70 and 72. If desired, these lever portions may be so designed that some braking may take place upon a full depression of the clutch pedal without operation of the brake pedal.

While I have shown certain preferred embodiments of my invention, they are to be understood as illustrative only as I contemplate such changes and modifications as come within the spirit and scope of the appended claims.

I claim:

1. In a brake construction, in combination with a vehicle chassis and steering wheels thereon, brakes carried by said wheels, a unitary transverse brake shaft for each wheel, each having a cam for operating its respective brake, said cams being located eccentrically of the turning axes of the steering wheels, and a member slidably supporting the brake shafts.

2. In a brake construction, in combination with a vehicle chassis and steering wheels thereon, brakes carried by said wheels, a unitary transverse brake shaft for each wheel, each having a cam for operating its respective brake, said cams being located eccentrically of the turning axes of the steering wheels, a member carried by the front axle slidably supporting the brake shafts, and a single pull rod connected to both transverse rods.

3. In a brake construction, in combination with a vehicle chassis having a rear axle, rear wheels and rear wheel brake shoes, and a transverse brake shaft carried by said rear wheel brake shoes.

4. In a brake construction, in combination with a vehicle chassis having a rear axle, rear wheels and rear wheel brake shoes, a transverse brake shaft carried by said rear wheel brake shoes, and means adapted to take up a longitudinal pull from said transverse brake shaft.

5. In a brake construction, in combination with a vehicle chassis having a rear axle, rear wheels and rear wheel brake shoes, a transverse brake shaft carried by said rear wheel brake shoes, and a bracket carried by the rear axle engaging the transverse brake shaft to take up braking pull upon the shaft.

6. In a brake construction, in combination with a vehicle chassis having a rear axle, rear wheels and rear wheel brake shoes, a transverse brake shaft carried by said rear wheel brake shoes, a rounded bearing surface on the transverse shaft, and a bracket carried by the rear axle engaging the rounded surface of the transverse brake shaft to take up braking pull upon the shaft.

7. In combination with a vehicle chassis, having front and rear axles and front and rear wheels carrying front and rear wheel brake shoes, a transverse brake shaft extending adjacent an axle and carried by the corresponding wheel brake shoes.

8. In combination with a vehicle chassis having front and rear axles and front and rear wheels carrying front and rear wheel brake shoes, a unitary transverse brake shaft extending adjacent and substantially parallel to an axle and supported solely by the corresponding wheel brake shoes.

9. In combination with a vehicle chassis having front and rear axles and front and rear wheels carrying front and rear wheel brake shoes, a unitary transverse brake shaft extending adjacent and substantially parallel to an axle and supported solely by the corresponding wheel brake shoes, and means carried by the axle and adapted to engage the transverse brake shaft to take up pull on the shaft longitudinally of the vehicle chassis.

10. In a brake construction, front wheel brakes and backing plates, front brake cross shafts extending from the upper portions of the backing plates to fulcrums carried by the front axle, said cross shafts having portions adjacent the backing plates extending approximately horizontal, and downwardly inclined portions extending downwardly to the plane of the axle.

EDWIN R. EVANS.